United States Patent
Littrell et al.

(10) Patent No.: US 7,030,746 B2
(45) Date of Patent: Apr. 18, 2006

(54) METHOD AND SYSTEM FOR GENERATING AUTOMATIC ALARMS BASED ON TRENDS DETECTED IN MACHINE OPERATION

(75) Inventors: Nathan Bowman Littrell, Gardnerville, NV (US); John Wesley Grant, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 10/824,485

(22) Filed: Apr. 15, 2004

(65) Prior Publication Data

US 2005/0231350 A1    Oct. 20, 2005

(51) Int. Cl.
*G08B 23/00*    (2006.01)

(52) U.S. Cl. ............. 340/500; 340/506; 340/3.1; 340/511; 340/517; 340/522

(58) Field of Classification Search .......... 340/506, 340/500, 3.1, 511, 517, 522
See application file for complete search history.

(56) References Cited

U.S. PATENT DOCUMENTS

| | | | |
|---|---|---|---|
| 5,200,743 A | | 4/1993 | St. Martin et al. |
| 5,400,246 A | * | 3/1995 | Wilson et al. ............. 700/17 |
| 6,405,139 B1 | | 6/2002 | Kicinski et al. |
| 6,507,804 B1 | | 1/2003 | Hala et al. |
| 2003/0182083 A1 | | 9/2003 | Schwenke et al. |
| 2003/0208706 A1 | | 11/2003 | Roddy et al. |

\* cited by examiner

*Primary Examiner*—Darly C. Pope
(74) *Attorney, Agent, or Firm*—Nixon & Vanderhye P.C.

(57) ABSTRACT

A method to detect a change in a condition of a system including: sensing the condition of the system and capturing data values indicative of the sensed condition; periodically determining a difference between a first data value and a second data value; determining a characteristic representative of a series of differences representative of a predetermined period; comparing the characteristic to at least one threshold level, and generating an alarm if the characteristic is beyond the threshold level.

27 Claims, 4 Drawing Sheets

METHOD AND SYSTEM FOR GENERATING AUTOMATIC ALARMS BASED ON TRENDS DETECTED IN MACHINE OPERATION

BACKGROUND OF THE INVENTION

The invention relates to detecting trends in machine operation and generating alarms when these trends indicate a potential machine malfunction or other alarm conditions.

Early notification of malfunctions or other alarm conditions in a machine or process assists operators to react to and cure the malfunction or condition. Early warning of malfunctions is particularly important for machines and processes in nuclear power plants, oil refineries, conventional power plants, pipeline pumping stations, manufacturing facilities, aircraft engines and in other critical facilities and applications. Early detection of a malfunction may allow an operator to prevent extensive damage to machines, stop a potentially dangerous condition, and maintain efficient and continuous operation.

Sensors are well known that monitor various machine conditions, e.g., vibration, temperature, flow pressure, lubrication flow and power output and/or demand. Some sensors average data over a period of time to mitigate effects of an erroneous sensor reading or short aberration in a machine condition. Based on the data from the sensors, machine controllers determine whether a malfunction has occurred or if conditions in the machine are ripe for a malfunction. These controllers may apply threshold levels to sensor data to determine if the machine condition exceeds a desired level. If the threshold level is exceeded by the sensor data, then the controller may generate an alarm condition. If the threshold level is set too high, the machine may have already malfunctioned and be damaged when the controller issues an alarm. If the threshold level is too low, the controller may issue too many false alarms. Accordingly, there is a need for algorithms to detect machine and process conditions that accurately identify potential malfunction conditions and provide early notice of such conditions.

BRIEF DESCRIPTION OF THE INVENTION

The invention may be embodied as a method to detect a change in a condition of a system including: sensing the condition of the system and capturing data values indicative of the sensed condition; periodically determining a difference between a first data value and a second data value; determining a characteristic representative of a series of differences representative of a predetermined period; comparing the characteristic to at least one threshold level, and generating an alarm if the characteristic is beyond the threshold level.

The invention may further be embodied as a method to detect a change in a condition of an operating system comprising: sensing the condition of the system and capturing data values indicative of the sensed condition; periodically determining a difference between a first data value and a second data value; determining a characteristic representative of a series of differences representative of a predetermined period; comparing the characteristic to a plurality of threshold levels, wherein each level corresponds to a severity alarm level, and generating the severity alarm level if the characteristic is beyond the corresponding threshold level and if the system is at a predetermined operating mode during a period corresponding to the series of differences.

The invention may also be embodied as a trend detection system comprising: a sensor monitoring a condition of an operating machine or process and generating sensor data; a computer controller receiving the sensor data and periodically storing said sensor data, said controller further comprising: a latch temporarily storing a first sensor data value and a second sensor data value; a difference logic function determining a difference value between the first and second sensor data values; a buffer storing a sequence of difference values inputted from the difference logic function; a logic function determining a characteristic of the sequence of difference values in said buffer; a comparator logic function determining whether said characteristic is beyond a predetermined threshold level, and a severity level alarm function generated if said comparator logic determines the characteristic is beyond the threshold level.

DETAILED DESCRIPTION OF THE INVENTION

A trending algorithm 18 has been developed to provide early notice of machine or process malfunctions and other potential alarm conditions. The algorithm tacks and measures changes in machine conditions, such as vibration levels. Trends in these changes in machine conditions are evaluated to determine if one of a plurality of alarm severity levels should be issued by the machine controller.

The trending algorithm 18 detects steady changes in the operation and characteristics of a subject machine or process. Based on trends in these changes, the algorithm provides early notification of potential malfunctions. The notification may, in some cases, be provided before the malfunction would have been detected with conventional threshold based alarm schemes.

The trending algorithm 18 provides for a way of alerting machine operators far in advance of developing problems. The invention will trigger when a machine condition begins to change rather than only after a threshold level of the condition is exceeded.

Figure 1:
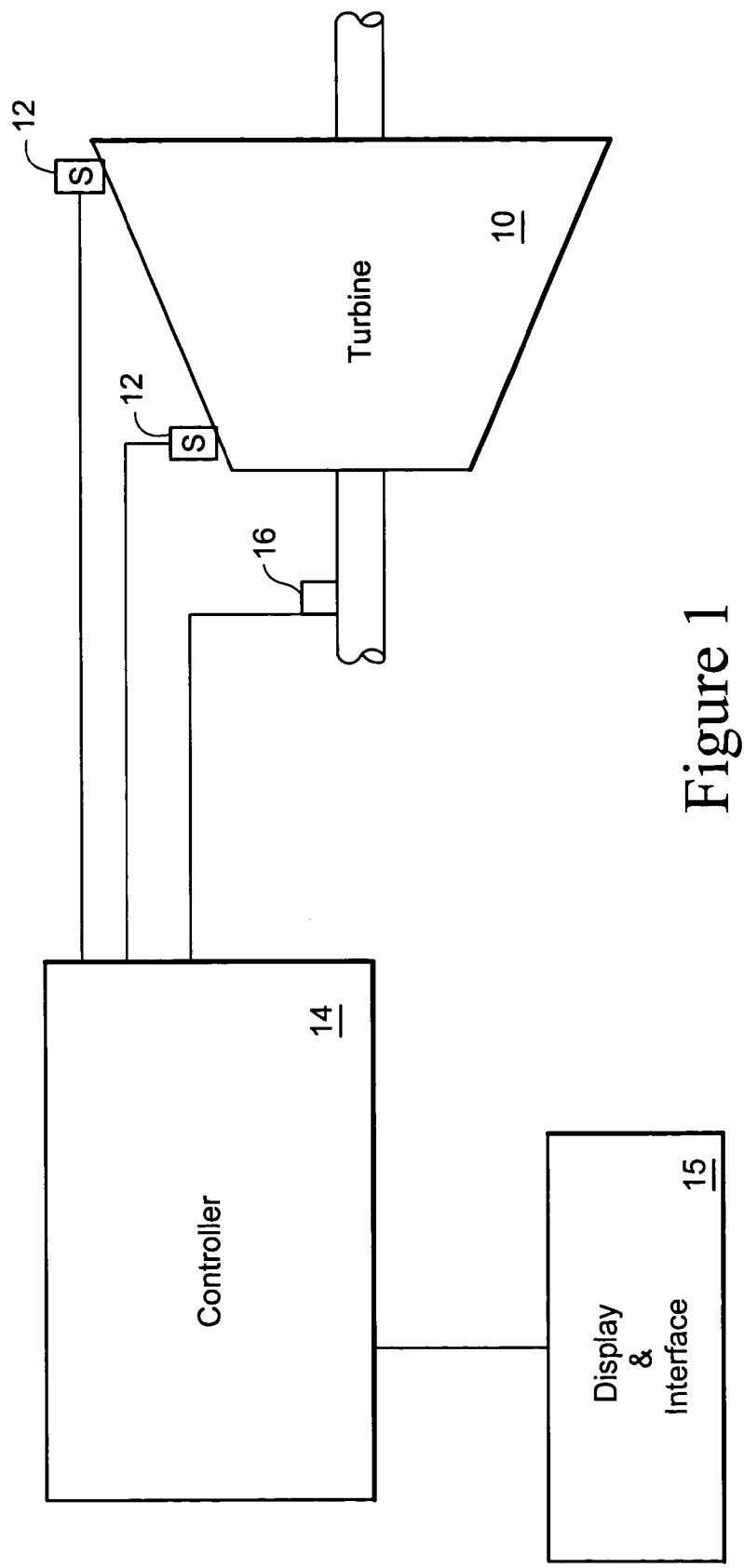
FIG. 1 is a schematic diagram of a turbine, monitored by sensors and controller.

FIG. 1 is a schematic diagram of a machine or process 10, such as a pump or turbine, that is monitored by various sensors, such as vibration sensors 12. Sensor data regarding the condition of the machine, such machine vibrations at various locations on and in the machine, is transmitted to and captured by a machine controller 14. A movement sensor 16 detects whether the rotor is moving which indicates whether the machine is operating.

The controller 14 implements inputs from operators regarding desired machine operational modes, receives sensor and other inputs regarding operating conditions of the machine and may generate commands to set operating parameters of the machine. In addition, the controller 14 may output information regarding machine operational conditions to a user display and interface 15. The controller generates alarms when a machine malfunction or other such condition is detected. The controller 14 may be a computer system, e.g., microprocessor, microcontroller or other computer system, having a processor and memory storing control algorithms, including a trending algorithm. The controller 14 may be local to the machine or at a location remote to the machine.

Figure 2:
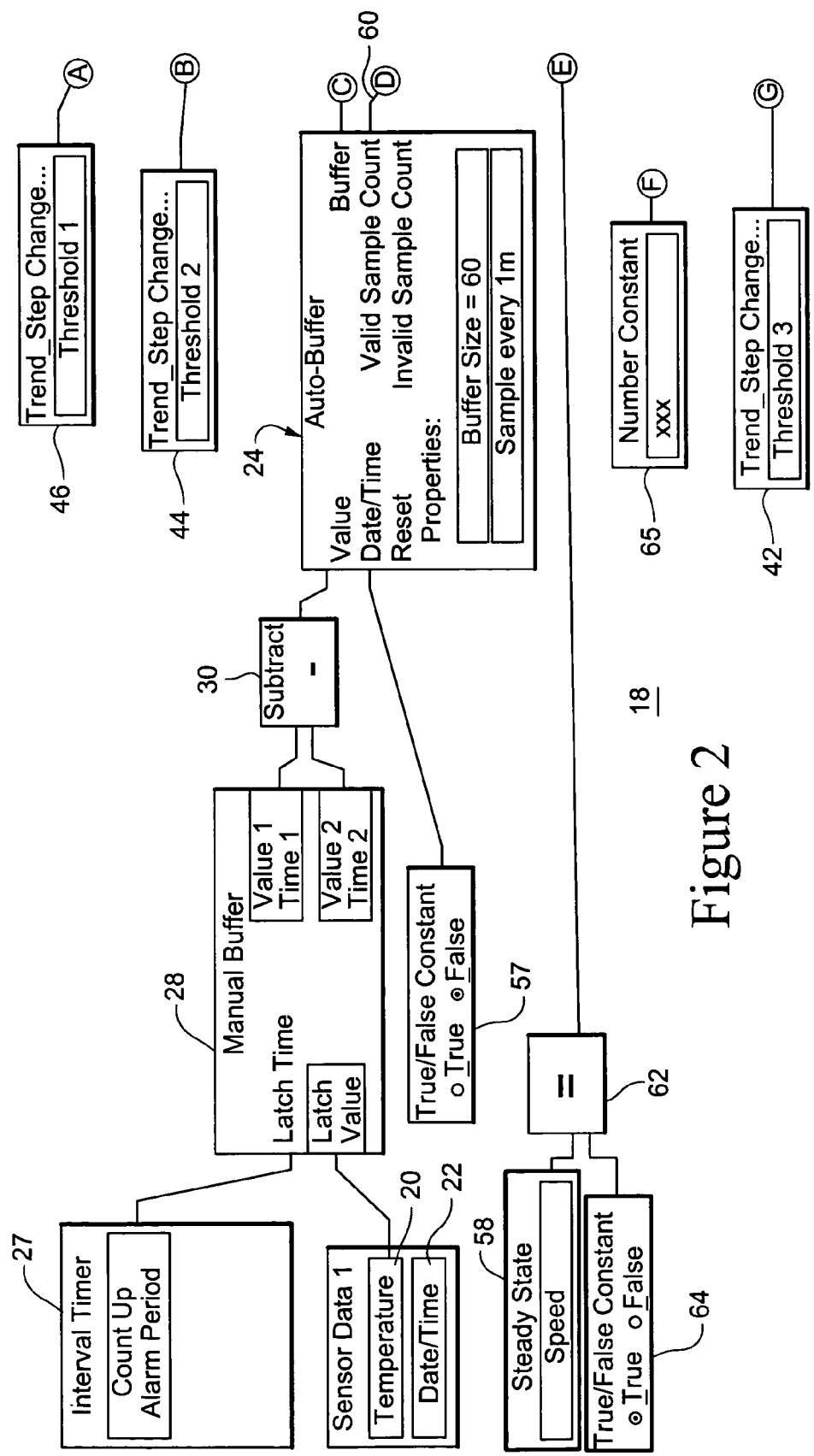
FIGS. 2 and 3 show a logic chart of a trending algorithm.
Figure 3:
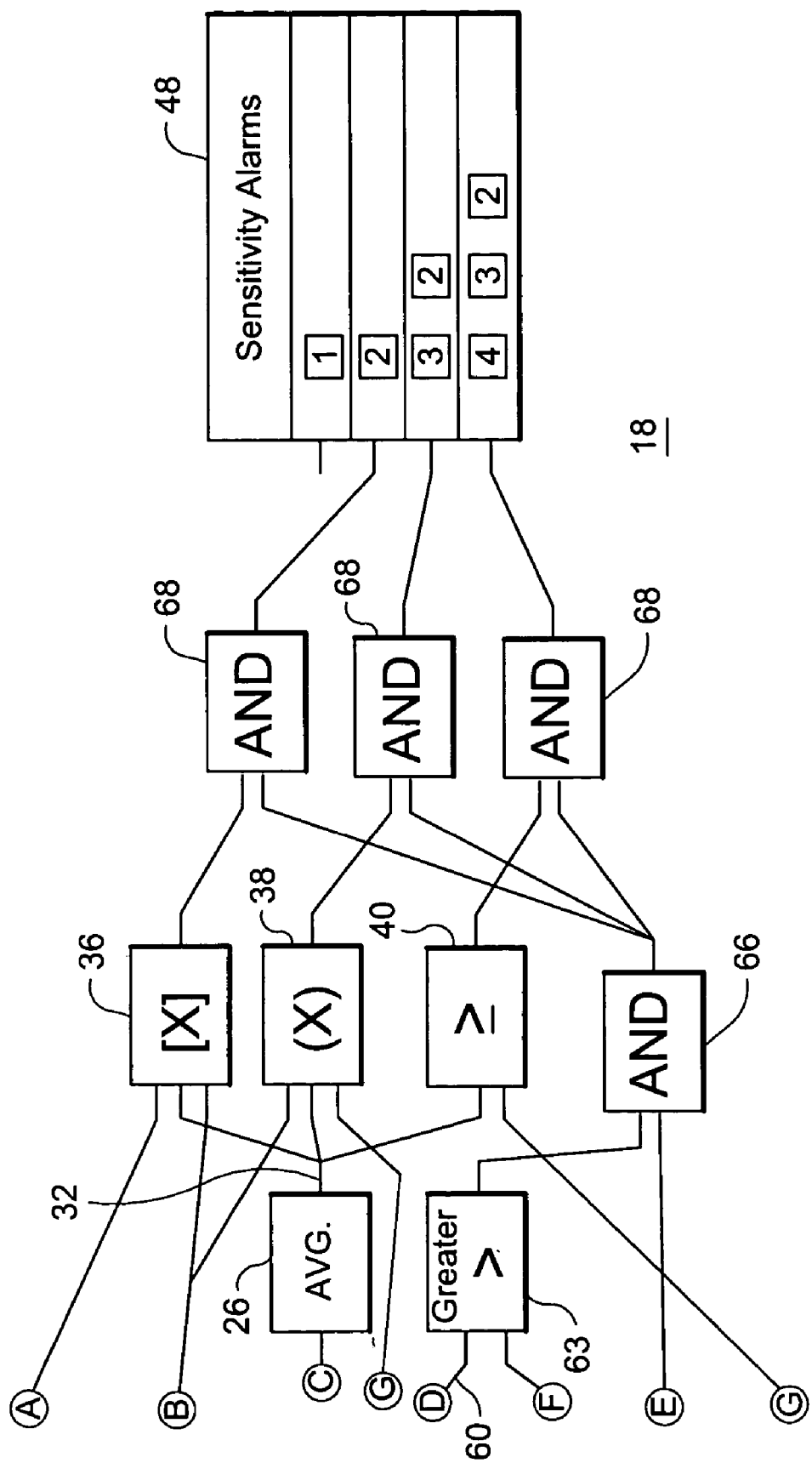

FIGS. 2 and 3 are a logic chart of an exemplary trending algorithm 18. Sensor data is received by the controller 14 which applies the data as inputs to the trending algorithm. The sensor data may be a bearing temperature, a vibration level or some other operating condition of the machine or process. The algorithm 18 determines a difference between a current sensor data value 20 and the immediately preceding data value. Comparing one data value to another allows the algorithm to track changes that occur in the operating condition sensed by the sensor.

The algorithm 18 repeatedly compares two (or more) sensor data values to determine a difference value that represents changes occurring in the machine. These difference values are stored in a buffer 24, which may have a variable or configurable buffer length. For example the buffer 24 may store sixty (60) difference values. These 60 difference values may correspond to a sensor monitoring time of one hour. The number of buffered difference values and the machine operational period corresponding to the buffered values is selected to suit a particular machine, application and the malfunction conditions to be detected.

The algorithm 18 periodically calculates an average 26 of the difference values stored in the difference buffer 24, e.g., an auto-buffer. For example, the average difference value may indicate an average temperature or vibration change that occurs during a particular one hour time period of machine operation. The average difference value is compared to one or more threshold levels, each indicating a particular severity level. If the average difference value exceeds one or more threshold levels, the controller issues alarms corresponding to the severity levels of the thresholds that have been exceeded.

The algorithm 18 is stored in and executed by the controller. Sensor data 20 and the date and time 22 when each data value is collected are applied as inputs to the trending algorithm 18. The inputs to the algorithm are data collected from sensors that monitor the operation of the machine. For example, vibration sensors 12 may measure machine conditions such as direct vibration amplitude, filtered vibration amplitude, or phase magnitude. The sensor data 20 may be, for example, raw sensor signal output, a processed signal output that has been converted to a value of the machine condition monitored by the sensor.

A rotor speed sensor 16 may detect movement by the rotor which is applied as an indication of whether the machine is operating or stopped. By using the rotor speed sensor data, the trending algorithm 18 may ensure that the periods during which machine conditions are averaged, corresponds to the machine.

Sensor data 20 is temporarily stored in a latch buffer 28. The latch buffer 28 stores a current data value 20 and its time 22 (value 1, time 1) and the prior data value 20 and its time (value 2, time 2). The interval between the collection of the successive data values (value 1 and value 2) is determined by an interval timer 27, which may be set by the machine operator during set up of the algorithm. The interval timer triggers the latch buffer 28 to periodically capture a new data value 20 and time 22. The latch buffer 28 temporarily stores the new data value and the preceding data value A logical subtraction operation 30 is performed to determine a difference between data value 1 and data value 2. The subtraction operation is preformed on the data values stored in the latch buffer. The difference value is the amount of change (positive, negative or none at all) between a pair of successive sensor data readings. The change in the sensor data readings provides an indication of a change occurring in the machine being monitored by the sensor at a particular point in time.

The difference value and the time of collection one of the values, e.g., value 2, is input to the difference buffer 24. The difference buffer 24 stores a sequence of data difference values inputted periodically from the subtraction logic unit 30. The sample period, e.g., once each minute, for the difference buffer may correspond to the interval period 27 for the latch buffer 28. The second buffer 24 may be arranged such that as each new difference value is added to the buffer 24, the oldest stored difference value is deleted from the buffer. Thus, the buffer 24 may be arranged as a first in, first out (FIFO) buffer.

The number of difference values stored in the second buffer 24 is determined by the buffer size, which may be variable and configurable. The size of the second buffer may be set by the operator during the setup of the algorithm for the machine or system. The size of the buffer 24 determines the number of difference values stored in that buffer and averaged together. The configurable buffer length allows the sensitivity of the trending algorithm to be tuned. A longer buffer size is less sensitive to individual changes, e.g., data spikes, in data values than is a short buffer.

The buffer 24 size may be set to correspond to a predetermined period, such as one hour, and to sample the data difference value at a certain interval, such as every minute. In this example, the buffer size is set to "60" so that 60 successive difference values are temporarily stored in the second buffer 24. Difference values are input to the second buffer every minute. Accordingly, the size of the buffer corresponds to a machine operation period of an hour.

An average of the difference values is calculated by a logic unit 26 in the controller, which may be a sequence of software instructions. This average represents an average change of the sensor data readings for an operational time period corresponding to the buffer size. In another embodiment, the logic unit 26 may analyze the difference data to determine various characteristics of the data, such as the mean, median and standard deviation of the difference data.

The basic trending algorithm 18 may be expressed is as follows:

If average (A$\Delta$) between T1, T2$\Rightarrow$Severity 2

If average (A$\Delta$) between T2, T3$\Rightarrow$Severity 3

If average (A$\Delta$)$\geq$T1, T2$\Rightarrow$Severity 4 where A$\Delta$ is the average of difference values in difference buffer 24 and T1, T2 and T3 are threshold levels 46, 44 and 42 respectively. The trending algorithm 18 may impose two additional data qualifications that must be met in order for the rule to execute: (1) the machine or system must be operating in a steady state as the sensor data values are captured that are used to determine the difference values, and (2) the number of valid samples in the difference buffer 24 must exceed a predetermined value, e.g., 58 out of 60. The sensor data that is processed by the controller is associated with various "flags" that indicate the data status. If the sensor data is determined to be invalid (for whatever reason), a flag may be associated with the data that is stored in the difference buffer 24 to designate the data sample as being valid or invalid. These qualifications of invalid and valid prevent the trending algorithm from issuing false severity alarms due to invalid data and due to intentional speed changes of the machine or system.

The trending algorithm 18 may be alternatively embodied to treat positive and negative difference values differently, such as by applying different threshold levels for positive average values of differences than are applied for negative average values. In addition, more or fewer levels of severity may be incorporated into the algorithm with corresponding more or fewer threshold levels.

The logic unit 26 outputs the average change 32 to a plurality of the threshold level comparators 36, 38 and 40. These comparators determine if the average change 32 is greater than an upper threshold level 42 (see comparator 40), between the upper threshold 42 and an intermediate threshold 44 (see comparator 38), or between the intermediate threshold 44 and a lower threshold 46 (see comparator 36). Each of the threshold levels 42, 44 and 46 may be set by the operator when setting up the trending algorithm for a particular machine or process. The threshold levels may correspond to various severity levels of the machine condition monitored by the sensors. The algorithm 18 outputs alerts and alarm notifications of variable severities 48.

The severity levels 48 may correspond to different alert levels for the system operator. For example, a severity level [1] may refer to a normal status where no alarms are issued, severity level [2] may cause the controller to indicate in a periodic report that a vibration or temperature change has exceeded the threshold level 46; severity level [3] may cause the controller to issue a visible and/or audible alarm on the display and user interface 15 as well as issue the report for severity level [3], and severity level [4] may cause the controller to shut down the machine, issue the audible and/or visible alarm and indicate the severity in the periodic report. The number of thresholds and their levels 42, 44 and 46, and the consequences of exceeding the thresholds may be configured during setup of the algorithm.

Figure 4:
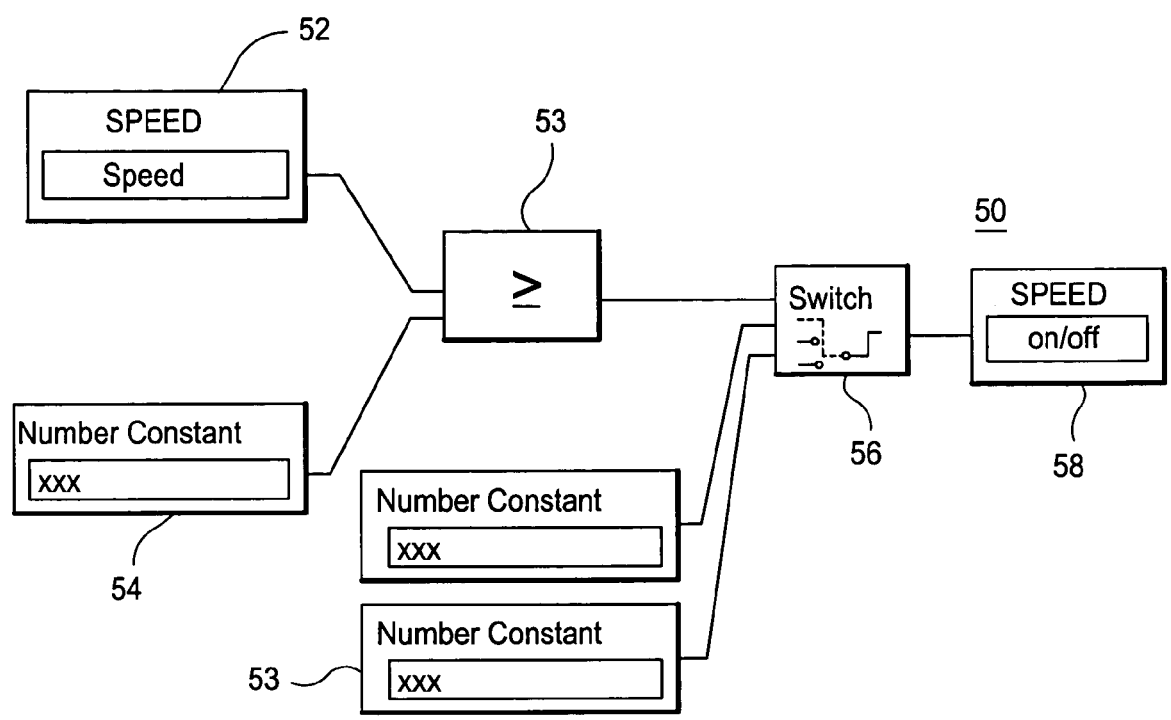
FIG. 4 is a logic chart of a detecting a minimum operating speed of a machine.

FIG. 4 is a logic chart of a running speed algorithm 50. A current machine running speed data value 52 is obtained from movement sensor 16 that senses the rotational speed of the machine. The speed is compared 53 to a constant speed level 54 that is set to a level corresponding to the normal steady-state operating speed for the machine. A true value is output to a switch 56 if the running speed of the machine is at or above the normal steady state operating speed. A True/False constant 57 logic value is applied to the difference buffer 24 to allow the buffer to be reset and to disable the buffer. A FALSE setting of logic unit 57 allows the difference buffer 24 to collect difference data.

In this example, the machine normally operates at a steady-state operating speed and does not run faster than that steady-state speed. The running speed algorithm is, in this embodiment, distinct from the trending algorithm that is the subject of the present invention. Other running speed algorithms may be used for machines that may have transitional speeds that are greater than the normal steady-state operating speed and for those machines that have more than one steady-state operating speed. If there are multiple steady-state operating speeds, it may be prudent to have a trending algorithm 18 tailored for each steady-state operating speed. For example, the running speed algorithm may determine whether the operating speed is within a predetermined speed range. Further, the running speed algorithm may monitor the operating speed over a period of time, e.g. an hour, to determine whether the speed is truly at a steady-state speed. If the speed is not steady-state, then the trending algorithm may be disabled.

If a false, e.g., OFF, speed value is output 58 from the running speed algorithm or if the number of invalid data difference values 60 exceeds a threshold level, then trending algorithm operation is disabled. The ON/OFF value 58 from the running speed algorithm is compared 62 to a constant 64, e.g. True/On. The constant determines the criteria, e.g., ON, applied the output of the running speed algorithm. The buffer has a reset latch that can be used to dump the buffer contents. Normally, the buffer is not reset and thus the a false input 57 is maintained to allow the buffer 28 to store data.

The output state 58 of the running speed algorithm is applied to an AND 66 logic function which generates a true signal only if the running speed value indicates that the machine is at a steady-state speed and that the number of invalid difference values in the second buffer 24 is no greater than 62 at a threshold level 65. The output of the first AND function 66 is applied to a series of AND functions 68 that checks that the output of the AND function 66 is true and that an output of a corresponding one of the comparators 36, 38 and 40 is true. The sequence of AND logic functions 66 and 68 requires the running speed value to be true, e.g., at a steady state, and invalid difference values to be low, before the trending algorithm will issue any of the severity level alarms.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to detect a change in a condition of a system comprising:
   a. sensing the condition of the system and capturing data values indicative of the sensed condition;
   b. periodically determining a difference between a first data value and a second data value;
   c. determining a characteristic occurring during a series of differences representative of a predetermined period;
   d. comparing the characteristic to at least one threshold level, and
   e. generating an alarm if the characteristic is beyond the threshold level.

2. A method as in claim 1 wherein the system is an operating machine.

3. A method as in claim 1 wherein the condition is vibration in the system.

4. A method as in claim 1 wherein the condition is a temperature of the system.

5. A method as in claim 1 wherein said data is collected at predetermined time intervals and further comprising collecting time data indicative of a time corresponding to an occurrence of each data value.

6. A method to detect a change in a condition of a system comprising:
   a. sensing the condition of the system and capturing data values indicative of the sensed condition;
   b. periodically determining a difference between a first data value and a second data value;
   c. determining a characteristic representative of a series of differences occurring during a predetermined period, wherein the characteristic representative of the series of differences is a mean value of the differences;
   d. comparing the characteristic to at least one threshold level, and
   e. generating an alarm if the characteristic is beyond the threshold level.

7. A method to detect a change in a condition of a system comprising:
   a. sensing the condition of the system and capturing data values indicative of the sensed condition;

b. periodically determining a difference between a first data value and a second data value;

c. determining a characteristic representative of a series of differences occurring during a predetermined period, wherein the characteristic representative of the series of differences is a median value of the differences;

d. comparing the characteristic to at least one threshold level, and e. generating an alarm if the characteristic is beyond the threshold level.

8. A method to detect a change in a condition of a system comprising:

a. sensing the condition of the system and capturing data values indicative of the sensed condition;

b. periodically determining a difference between a first data value and a second data value;

c. determining a characteristic representative of a series of differences occurring during a predetermined period, wherein the characteristic representative of the series of differences is a standard deviation of the differences;

d. comparing the characteristic to at least one threshold level, and e. generating an alarm if the characteristic is beyond the threshold level.

9. A method to detect a change in a condition of a system comprising:

a. sensing the condition of the system and capturing data values indicative of the sensed condition;

b. periodically determining a difference between a first data value and a second data value;

c. determining a characteristic representative of a series of differences occurring during a predetermined period;

d. comparing the characteristic to at least one threshold level;

e. generating an alarm if the characteristic is beyond the threshold level, and f. temporarily storing the series of differences in a buffer and setting a buffer size to correspond to the predetermined period.

10. A method as in claim 9 wherein steps (d) and (e) further comprise:

establishing a threshold level for each of a plurality of severity levels;

comparing the characteristic to each of said threshold levels, and issuing a severity level alarm for each of said threshold levels exceeded by the characteristic.

11. A method to detect a change in a condition of an operating system comprising:

a. sensing the condition of the system and capturing data values indicative of the sensed condition;

b. periodically determining a difference between a first data value and a second data value;

c. determining a characteristic representative of a series of differences occurring during a predetermined period;

d. comparing the characteristic to a plurality of threshold levels, wherein each level corresponds to a severity alarm level, and e. generating the severity alarm level if the characteristic is beyond the corresponding threshold level and if the system is at a predetermined operating mode during a period corresponding to the series of differences.

12. A method as in claim 11 wherein the predetermined operating mode is an operating speed above a predetermined speed mode.

13. A method as in claim 11 wherein the predetermined operating mode is system rotational speed above a predetermined rotational speed.

14. A method to detect a change in a condition of an operating system comprising:

a. sensing the condition of the system and capturing data values indicative of the sensed condition;

b. periodically determining a difference between a first data value and a second data value;

c. determining a characteristic representative of a series of differences occurring during a predetermined period;

d. comparing the characteristic to a plurality of threshold levels, wherein each level corresponds to a severity alarm level, and e. generating the severity alarm level if the characteristic is beyond the corresponding threshold level and if the system is at a predetermined operating mode during a period corresponding to the series of differences, and f. disabling the severity alarm level generation if a number of invalid differences exceeds a predetermined number.

15. A method as in claim 11 wherein the system is an operating machine.

16. A method as in claim 11 wherein the condition is vibration in the system.

17. A method as in claim 11 wherein the condition is a temperature of the system.

18. A method as in claim 11 wherein said data is collected at a predetermined time interval and further comprising collecting time data indicative of a time corresponding to an occurrence of each data value.

19. A method to detect a change in a condition of an operating system comprising:

a. sensing the condition of the system and capturing data values indicative of the sensed condition;

b. periodically determining a difference between a first data value and a second data value;

c. determining a characteristic representative of a series of differences occurring during a predetermined period, wherein the characteristic representative of the series of differences is an mean value of the differences;

d. comparing the characteristic to a plurality of threshold levels, wherein each level corresponds to a severity alarm level, and e. generating the severity alarm level if the characteristic is beyond the corresponding threshold level and if the system is at a predetermined operating mode during a period corresponding to the series of differences.

20. A method to detect a change in a condition of an operating system comprising:

a. sensing the condition of the system and capturing data values indicative of the sensed condition;

b. periodically determining a difference between a first data value and a second data value;

c. determining a characteristic representative of a series of differences occurring during a predetermined period, wherein the characteristic representative of the series of differences is a median value of the differences;

d. comparing the characteristic to a plurality of threshold levels, wherein each level corresponds to a severity alarm level, and e. generating the severity alarm level if the characteristic is beyond the corresponding threshold level and if the system is at a predetermined operating mode during a period corresponding to the series of differences.

21. A method to detect a change in a condition of an operating system comprising:
   a. sensing the condition of the system and capturing data values indicative of the sensed condition;
   b. periodically determining a difference between a first data value and a second data value;
   c. determining a characteristic representative of a series of differences occurring during a predetermined period, wherein the characteristic representative of the series of differences is a standard deviation of the differences;
   d. comparing the characteristic to a plurality of threshold levels, wherein each level corresponds to a severity alarm level, and
   e. generating the severity alarm level if the characteristic is beyond the correspondina threshold level and if the system is at a predetermined operating mode during a period corresponding to the series of differences.

22. A method to detect a change in a condition of an operating system comprising:
   a. sensing the condition of the system and capturing data values indicative of the sensed condition;
   b. periodically determining a difference between a first data value and a second data value;
   c. determining a characteristic representative of a series of differences occurring during a predetermined period;
   d. comparing the characteristic to a plurality of threshold levels, wherein each level corresponds to a severity alarm level, and
   e. generating the severity alarm level if the characteristic is beyond the corresponding threshold level and if the system is at a predetermined operating mode during a period corresponding to the series of differences, and
   f. temporarily storing the series of differences in a buffer and setting a buffer size to correspond to the predetermined period.

23. A trend detection system comprising:
   a sensor monitoring a condition of an operating machine or process and generating sensor data;
   a computer controller receiving the sensor data and periodically storing said sensor data, said controller further comprising:
      a latch temporarily storing a first sensor data value and a second sensor data value;
      a difference logic function determining a difference value between the first and second sensor data values;
      a buffer storing a sequence of difference values inputted from the difference logic function;
      a logic function determining a characteristic of the sequence of difference values in said buffer;
      a comparator logic function determining whether said characteristic is beyond a predetermined threshold level, and
      a severity level alarm function generated if said comparator logic determines the characteristic is beyond the threshold level.

24. A trend detection system as in claim 23 wherein said condition is an operating characteristic of the machine.

25. A trend detection system as in claim 23 wherein said condition is a vibration level of the machine.

26. A trend detection system as in claim 23 wherein said condition is a temperature level of the machine.

27. A trend detection system as in claim 23 wherein said sensor data is collected at predetermined time intervals.

* * * * *